United States Patent [19]

Poon et al.

[11] Patent Number: 5,687,254

[45] Date of Patent: Nov. 11, 1997

[54] SEARCHING AND MATCHING UNRECOGNIZED HANDWRITING

[75] Inventors: Alex D. Poon, Mountain View; Karon Anne Weber; Todd A. Cass, both of San Francisco, all of Calif.

[73] Assignee: Xerox Corporation, Stamford, Conn.

[21] Appl. No.: 254,382

[22] Filed: Jun. 6, 1994

[51] Int. Cl.[6] .................. G06K 9/72; G06K 9/00
[52] U.S. Cl. .................. 382/229; 382/187; 382/230
[58] Field of Search ................ 382/241, 313, 382/229, 178, 186, 226, 230, 187; 395/800; 364/231.9, 229.2, 259, 259.2

[56] References Cited

U.S. PATENT DOCUMENTS

| Re. 31,200 | 4/1983 | Sukonick et al. | 340/724 |
|---|---|---|---|
| 4,718,103 | 1/1988 | Shojima et al. | 382/241 |
| 4,731,857 | 3/1988 | Tappert | 382/9 |
| 5,062,143 | 10/1991 | Schmitt | 382/228 |
| 5,161,245 | 11/1992 | Fenwick | 382/229 |
| 5,235,651 | 8/1993 | Nafarieh | 382/313 |
| 5,267,332 | 11/1993 | Walch et al. | 382/258 |
| 5,321,770 | 6/1994 | Huttenlocher et al. | 382/22 |
| 5,329,405 | 7/1994 | Hou et al. | 382/218 |
| 5,333,209 | 7/1994 | Sinden et al. | 382/313 |
| 5,392,363 | 2/1995 | Fujisaki | 382/187 |
| 5,438,630 | 8/1995 | Chen et al. | 382/159 |
| 5,463,696 | 10/1995 | Beernink et al. | 382/186 |
| 5,528,701 | 6/1996 | Aref | 382/226 |

OTHER PUBLICATIONS

James S. Lipscomb, "A Trainable Gesture Recognizer", *Pattern Recognition*, vol. 24, No. 9, pp. 895–9075, 1991.

Poon, A., Weber, K., Cass, T. "Scribbler: A Tool for Searching Digital Ink," Proceedings of the ACM Conference on Human Factors in Computing Systems, Denver, CO, May 1995 (page numbers unknown); published as a short paper; also available at http://www.acm.org/sigchi/chi95/Electronic/documnts/shortppr/adp$_{13}$bdy.htm.

Lopresti, D. and Tomkins, A., "On the Searchability of Electronic Ink", *IWFHR—IV, (The Fourth International Workshop on Frontiers in Handwriting Recognition)*, Dec. 7–9, 1994, Taipei, Taiwan, Republic of China, pp. 156–165.

Aref, W. and Barbara, D., "The Handwritten Trie: Indexing Electronic Ink", publication source unknown, dated Oct. 28, 1994, pp. 1–25.

(List continued on next page.)

*Primary Examiner*—Leo Boudreau
*Assistant Examiner*—Monica S. Davis
*Attorney, Agent, or Firm*—Judith C. Bares

[57] ABSTRACT

A method and system provide for searching and matching gesture-based data such as handwriting without performing a recognition process on the handwritten gesture data to convert it to a standard computer-coded form. Target data collected as sample data points of spatial coordinates over time are concatenated into a single target gesture sequence of sample data points. The sample data points comprising the gesture-based data structure to be searched (the corpus) are grouped into corpus gesture sequences for matching against the target gesture sequence. Matching may be done by any suitable method, and a novel signal comparison technique based on dynamic time warping concepts is illustrated. The result of the matching is a list of the locations of the matching corpus gesture sequences in the corpus, which in turn may be used for further processing, such as the display of an image of the matching corpus gestures for a system user. The ability to determine the existence and location of a gesture in the corpus that matches a target gesture is the basis for performing a variety of additional functions, such as a "find and replace" function and the ability to use gestures as keywords to index a gesture-based data structure without performing recognition on either the keyword gestures or the gesture-based data structure. The technique is suitable for inclusion in any system that accepts gesture-based data, such as a personal digital assistant (PDA) or other pen-based computing device.

23 Claims, 5 Drawing Sheets

OTHER PUBLICATIONS

D. Lopresti and A. Tompkins, "On the Searchability of Electronic Inc.", Matsushita Information Technology Laboratory Technical Report 114–94, Aug. 19, 1994, available at ftp://mitl.research.panasonic.com/pub/tr/.

D. P. Lopresti and A. Tomkins, Approximate Matching of Hand–Drawn Pictograms. In *Proceeding of the Third International Workshop on Frontiers in Handwriting Recognition*, May 1993.

D. P. Lopresti and A. Tomkins, Pictographic Naming. In *Proceedings of INTER–CHI93*, Sep. 1993.

Daniel Barbara, Method to Index Electronic Handwritten Documents, *Technical Report MITL–TR–77–93*, Matsushita Information Technology Laboratory, Princeton, NJ, Nov. 1993.

D. P. Lopresti and A. Tomkins, "Pictographic Naming," Technical Report *No. MITL–TR–21–92*, Matsushita Information Technology Laboratory, Princeton, N.J., Aug. 1992.

D. P. Lopresti and A. Tomkins, "A Comparison of Techniques for Graphical Database Queries," Technical Report *No. MITL–TR–45–93*, Matsushita Information Technology Laboratory, Princeton, N.J., Jan., 1993.

D. P. Lopresti and A. Tomkins, "Applications of Hidden Markov Models to Pen–Based Computing", Technical Report No. *MITL–TR–32–92*, Matsushita Information Technology Laboratory, Princeton, N.J., Nov., 1992.

J. M. Kurtzberg and C. C. Tappert, "Symbol Recognition System By Elastic Matching," IBM Technical Disclosure Bulletin, vol. 24, No. 6, pp. 2897–2902 Dec. 1992.

The aha!™ InkWriter™ Handbook, user's manual accompanying software product known as aha!™ InkWriter™ published by aha!™ software corporation, Mountain View, California, Jun. 1993, pp. 1–57.

J. Kruskal and M. Liberman, "The Symmetric Time Warping Problem: From Continuous to Discrete,", Chapter 4 in *Time Warps, String Edits, and Macromolecules: The Theory and Practice of Sequence Comparison*, D. Sankoff and J. Kruskal, eds., Addison–Wesley Publishing Co., May 1983, at p. 125.

C. Myers, L. Rabiner, and A. Rosenberg, "Performance Tradeoffs in Dynamic Time Warping Algorithms and Isolated Word Recognition," in *IEEE Transactions on Acoustics, Speech, and Signal Processing*, vol. ASSP–28, No. 6, Dec., 1980, at pp. 623–634.

H. Sakoe and S. Chiba, "Dynamic Programming Algorithm Optimization for Spoken Word Recognition", in *IEEE Transactions on Acoustics, Speech, and Signal Processing*, vol. ASSP–26, No. 1, Feb., 1978, at pp. 43–49.

D. Kurlander and Eric Bier, "Graphical Search and Replace", in *SIGGRAPH '88 on Computer Graphics*, vol. 22, No. 4, Aug., 1988, at pp. 113–120.

G. M. Miller, "On Line Recognition of Hand Generated Symbols", Fall Joint Computer Conference, 1969, at pp. 399–412.

N. M. Herbst and C. N. Liu, "Automatic Signature Verification", *Computer Analysis and Perception*, vol. I, Visual Signals, at pp. 83–105, (date of publication unknown).

J. M. Kurtzberg, "Feature Analysis for Symbol Recognition by Elastic Matching", *IBM J Res Develop*, vol. 31, No. 1, Jan., 1987, at pp. 91–95.

D. J. Burr, "A Technique for Comparing Curves", *IEEE PRIP '79 Proceedings*, Aug., 1979, at pp. 271–277.

R.W. Christiansen and C. K. Rushforth, "Detecting and Locating Key Words in Continuous Speech Using Linear Predictive Coding", in *IEEE Transactions on Acoustics, Speech, and Signal Processing*, vol. ASSP–25, No. 5, Oct., 1977, at pp. 361–367.

D. Rubine, "Specyfing Gestures by Example", in *SIGGRAPH '91 on Computer Graphics*, vol. 25, No. 4, Jul., 1991, at pp. 329–337.

C.C. Tappert, "Speed, Accuracy, Flexibility Trade Offs in On–Line Character Recognition", in an *IBM Research Report*, RC 13228 (#59158), Oct., 1987 at pp. 1–20.

Oppenheim and Schafer, "Discrete–Time Signal Processing", Prentice–Hall, 1989, Chapter 2, at pp. 8–67.

Huttenlocher, et al., "Comparing Images Using the Hausdorff Distance", in *IEEE Transactions on Pattern Analysis and machine Intelligence*, vol. 15, No. 9, Sep., 1993, at pp. 850–863.

Yasuhara, M. and M. Oka, "Signature Verification Experiment Based on Nonlinear Time Alignment: A Feasibility Study", in *IEEE Transactions on Systems, Man and Cybernetics*, Mar. 1977, pp. 212–216.

SEARCHING AND MATCHING UNRECOGNIZED HANDWRITING

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to information processing in systems that accept gestures as input, and more particularly to a system and method for mapping a target gesture-based data item to one or more substantially identical data items in a data structure of data based on gestures, without performing conventional recognition techniques on the gesture-based data.

BACKGROUND

Some processor-controlled information systems, such as, for example, portable computing devices known variously as notebook computers, personal digital assistants (PDAs), personal communicators, or personal interactive devices, make use of a pen-like input device to enter data in the form of gestures that resemble conventional block letter or cursive handwriting characters and in the form of graphical pictures, shapes or symbols. In some programs, the gesture data are stored as entered. Typically, however, the gesture-based data alone is in a data form that is thought to be of limited or no present utility, and so is discarded once converted to a conventional data form that is of utility to a processor. Thus, many gesture-based data handling systems assume that it is necessary to perform recognition processes on the data based on gestures in order to convert the handwritten or picture input into "recognized," predefined shapes, such as circles, rectangles or straight lines, or into a standard coded representation of characters, such as the standard data format known as ASCII, in order for the data to be suitable for use in standard processor-based applications such as word processing, electronic mail, drawing, graphics, and data base applications. An example of such a system is the Newton® MessagePad available from Apple® Computer, Cupertino, Calif., which performs a handwriting recognition process on the user's handwritten input and stores the recognized data for use, for example, as calendar entries, addresses and phone numbers, and as text for use in electronic mail messages.

Using a device that accepts gesture input for the purpose of performing recognition on the gesture data typically requires a time investment on the part of the user in "training" the device as to the user's typical writing style in order to facilitate the recognition process later. In the case of the Newton, for example, during the training phase, a user must select the letter "a" from several templates that are presented that most closely corresponds to the shape and style of the letter "a" the user is most likely to make when using the Newton. Moreover, even with such training, the process of performing recognition of data based on gestures, such as printed or cursive handwriting, is complex and prone to producing errors that need frequent human intervention to correct. The more time and human intervention that is needed to both train the device and to produce accurate computer-understood input, the more frustrating and the less useful the system is perceived to be by the user. Current recognition systems are further limited as to the forms of handwriting they can recognize, with recognition of block printed characters having the highest success rate. Recognition of cursively written characters is complicated by the fact that the characters are written as a single connected line. Detecting the separation of the characters at the inter-character ligatures and then recognizing each separated character has been computationally expensive for computerized recognition systems.

Because of the current problems with handwriting recognition, the utility of systems that accept gestures as input would be improved if some functionality were available without explicitly requiring recognition of the data based on gestures. A software product known as "aha!™ InkWriter™" from aha!™ software corporation, Mountain View, Calif., provides editing functions that are apparently based on the gesture-based data itself. InkWriter operates on a computer or PDA that uses the PenPoint® operating system from GO corporation. The aha!™ InkWriter™ Handbook, 1993, indicates that the software provides some functional gesture-based data processing ability to the user, similar to that provided in a conventional word processing application, without first requiring the user to explicitly invoke a handwriting recognition process. For example, the software permits the user to delete portions of the handwritten input, referred to as "writing", to move the writing around on the page, or to copy a portion of the writing to another location. The Handbook also indicates that writing may be "translated" into what is referred to as "computer text", or just "text." Illustrations in the Handbook indicate that "translation" corresponds to a conventional handwriting recognition process, and that, once translated, writing appears displayed on the display of the device being used in a conventional, default character font. Mistakes in translation may be corrected by the user according to the practices provided by the developer of the system's operating system.

InkWriter also provides a word or character search capability for searching handwriting for a certain word or character, while the handwriting appears displayed in writing form, rather than as computer text. Searching in this manner involves the user selecting the document that is to be searched, and choosing the Find function from the Edit menu; in response to the selection of the Find function, a Find dialog sheet opens. The user prints the word he or she wants to find. The Handbook states that the word the user prints in the Find dialog sheet is translated immediately. If the word needs correcting, the user can draw a gesture to open an editing pad, make the correction, and make a gesture to close the pad. This editing process ensures that the word that the user has printed is recognized as the word the user intended for searching. The user then makes a gesture on the "Find" button that appears in the Find dialog sheet. If the word is found, the word "Found" appears in the result section of the Find sheet and the word is selected. The user can search for further occurrences of the same word by repeatedly tapping Find. When the word cannot be found again in the text, the words, "Reached end" appear in the dialog sheet. Because the search capability described in the aha! InkWriter Handbook depends on performing handwriting recognition on the searched-for word entered by the user, it would be reasonable to conclude that handwriting recognition is performed on the writing in the document being searched, even though the user has not taken an affirmative step to translate the writing into computer text, and despite the fact that the writing does not appear displayed to the user as computer text. The ability to successfully locate words in documents using the InkWriter software, then, depends on the accuracy and robustness of the translation or recognition process. The Handbook supports this conclusion by advising the user to print, rather than write in longhand, if the user plans to be doing a lot of searching.

A recognition system converts a gesture-based data input target, such as handwriting, into a computer-coded or human-understandable form by mapping it to, or classifying it as, one of many known templates or prototypes of the gesture that are stored in what may be called a reference data structure; a successful mapping identifies the computer-coded of human-understandable form of the gesture, or identifies the writer of the gesture. Such systems typically fall into one of the categories of handwriting recognition, signature verification, and writer identification. The purpose of the system may determine the type of data that is collected and utilized; handwriting data has two information components: a semantic information component that corresponds to the handwriting's content; and a "singular" information component that corresponds to the individual characteristics of the writer, such as the particular shape of characters, and the pressure, velocity or acceleration of the strokes. Signature verification and writer identification systems work independently of the semantic information component of the target gesture, mapping a target gesture to reference templates or prototypes that are defined in terms of the singular information component. In a signature verification system, a target signature is compared to the one or more reference templates of a single claimed identity; in contrast, a writer identification system typically establishes a writer's identity by comparing some specific non-content attributes of the target writer's handwriting with those of all the N writers enrolled in a reference data base, R, and then finding the match that most closely meets a threshold. A handwriting recognition system, on the other hand, maps the semantic component of the target gesture to reference templates or prototypes that are defined in terms of their semantic information component, for example the approximately 36 alphanumeric symbols for block characters in English.

An important characteristic of each of these types of recognition systems is the nature of the reference data structure to which target inputs are to be mapped. A reference data structure of template or prototype data objects contains what may be called "enrolled" data objects, that is, data objects that are entered into the reference data structure for the specific purpose of enabling the classification of target inputs; the data that comprises each enrolled data object is extensively prepared for the features, characteristics, or variations in the data that may be expected from potential targets. The accuracy and reliability of a recognition system, then, is directly related to the quality of preparation and characterization of the gesture-based data of the reference templates to which a target gesture is mapped. The large variability in handwriting styles among the potential users of PDA devices, along with a variety of environmental factors that may affect or alter a user's normal handwriting, make the development of broad but accurate reference templates a very difficult task.

As long as handwriting recognition systems produce unreliable, error-prone results, the wider use and utility of systems that accept gestures as input will be significantly limited by the dependence of these systems on applying a recognition process to the gesture-based data. What is needed to improve the usefulness of such systems is to reduce this dependency on recognition by providing expanded and more robust processing functionality that uses the gesture-based data directly, without performing recognition.

SUMMARY OF THE INVENTION

The present invention provides a novel technique for determining whether a target gesture-based data item occurs in a body of data based on gestures (hereafter, called the "gesture-based data structure"), such as handwritten notes or documents that include cursive or block printed handwriting as well as graphical pictures or symbols, without applying a recognition process to either the target gesture-based data or the gesture-based data structure. The present invention is thus advantageous to the overall usefulness of systems that accept gestures as input by improving the utility of these systems, and by reducing the dependence of these systems on the success of a handwriting recognition process. Determining the occurrence of a target gesture in a gesture-based data structure provides the capability to perform a variety of processing functions, including a search function that may provide a user with an image of the gesture-based data structure highlighting the location(s) of the target gesture, and a function analogous to a "find and replace" function in a word processing application, where the located target gesture may be replaced with a second target gesture. In addition, in conjunction with software that builds a keyword index of a data structure, gestures may be used as keywords to index a gesture-based data structure without performing recognition on either the keyword gestures or the gesture-based data structure.

Another advantage of the matching technique of the present invention is its ability to minimize the impact of the stylistic variations among writers on the accuracy of the matching process by allowing the target gesture used for searching to be selected from the gesture-based data structure that is to be searched, if it exists there. A first writer reviewing the handwritten notes of a second writer that expresses a certain concept or idea could search for all of the occurrences of that concept of idea in the notes by selecting it as a target gesture for searching. The target gesture would then have the stylistic characteristics of the original, second writer and the gestures in the rest of notes, which is likely to improve matching results.

In its simplest terms, the present invention is premised on the discovery that reasonably accurate gesture matching between a target gesture and a gesture in the gesture-based data structure can be achieved by using any one of several signal comparison techniques to match a target gesture to each gesture in the gesture-based data structure until all gestures have been compared to the target, to determine if and where the target gesture is included in the gesture-based data structure. Because of the variability between writers in entering gesture-based data, a single gesture provided as the target may occur in the gesture-based data structure as a sequence of two or more gestures, or a single gesture included in the gesture-based data structure may be entered as a sequence of two or more target gestures. The invention provides for concatenating a sequence of target gestures into a single group of sample data points for purposes of performing signal comparison. Then, since it is possible that the target may be matched in the gesture-based data structure by either a single gesture or a sequence of gestures, the invention provides to the signal comparison process, as input with the target gesture, a grouping of sample data points from the gesture-based data structure. Providing such groupings of sample data points from the gesture-based data structure for comparison reduces the impact of the handwriting variations among writers on the invention's ability to make matches, and thus improves accuracy.

The signal comparison technique mathematically represents, in the form needed for comparison, the signal components of the target gesture signal and of the signal for the grouping of sample data points from the gesture-based data structure, performs the comparison, and yields a score that indicates how well the two signals match. This score is evaluated against a threshold score that indicates a minimum or maximum comparison score needed to meet a desired level of accuracy in matching. Depending on the specific signal comparison technique that is used, the threshold score may be empirically determined.

Therefore, in accordance with the present invention, there is provided a method of operating a system that includes a signal source for providing data based on gestures, memory for storing data based on gestures, and a processor connected for receiving signals. The method comprises receiving target gesture data from the signal source. The target gesture data is based on a first gesture and includes a first plurality of sample data points indicating the first gesture's path of motion over an interval of time. A gesture-based data structure stored in the system memory is provided that indicates information about gestures and includes, for each respective gesture, a plurality of sample data points indicating a respective path of motion over a respective interval of time of the respective gesture. The second plurality of sample data points are grouped into a plurality of corpus gesture sequences, each including at least two sample data points. Then, the target gesture data is compared to each of the corpus gesture sequences to determine if the target gesture data matches one of the corpus gesture sequences. A list of corpus gesture sequences that match the target gesture data is produced. The list includes, for each corpus gesture sequence, the location in the gesture-based data structure of the matching corpus gesture sequence.

In accordance with another aspect of the present invention, a processor-controlled system is provided that comprises a signal source for providing target gesture-based data including a first plurality of sample data points indicating a first path of motion over a first interval of time of a first gesture; a processor connected for receiving the target gesture-based data from the signal source; and memory for storing data. The data stored in the memory includes instruction data indicating instructions the processor can execute, and a gesture-based data structure that indicates information about gestures and includes, for each respective gesture, a plurality of sample data points indicating a respective path of motion over a respective interval of time of the respective gesture. The processor is also connected for accessing the data stored in the memory. The processor, in executing the instructions in response to receiving the target gesture-based data from the signal source, groups the second plurality of sample data points into a plurality of corpus gesture sequences, each corpus gesture sequence including at least two sample data points. The processor then compares the target gesture-based data to each of the corpus gesture sequences to determine whether the target gesture-based data matches one of the corpus gesture sequences, and produces a matching list of corpus gesture sequences that match the target gesture sequence. The matching list includes, for each corpus gesture sequence, the location in the gesture-based data structure of the matching corpus gesture sequence.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts and acts.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

A. Conceptual Framework.

The present invention relates to operating a machine or system including a processor, and to processing electrical or other physical signals to produce other desired physical signals. The detailed descriptions which follow are presented largely in terms of display images and symbolic representations of operations of data within the memory of the system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities. Further, the manipulations performed are often referred to in terms, such as adding, comparing, or determining, which are commonly associated with mental operations performed by a human user. Apart from supplying certain signals to the machine or system operated by the invention, the capability of a human user is neither necessary nor desirable in the operations described herein which form part of the present invention. In addition, the algorithmic descriptions of the invention that are presented herein for operating the system are not inherently related to any particular processor, machine, or other apparatus. The machine or system may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiment of the claimed invention illustrated in the accompanying drawings. These terms have the meanings indicated below throughout this specification and in the claims, rather than any meanings that may occur in other sources, such as, for example, any documents that are incorporated by reference herein elsewhere in this description.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. For example, data based on a gesture indicates the x and y coordinates of the gesture's path of motion over an interval of time. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when a first item of data indicates position information of an image display feature in the display area of a display device, and the position information may be used by the processor to obtain a second data item in a data structure, the first item of data indicates the second item of data.

A "processor-controlled machine" or "processor" is any machine, component or system that can process data, and may include one or more central processing units or other processing components. Any two components of a machine or system are "connected" when there is a combination of circuitry that can transfer data from one of the components to the other. "Memory" is any component, combination of components, circuitry, or system that can store data. An example of memory is a storage medium access device with a data storage medium that it can access. A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An "image" is a pattern of light. An image may include characters, words, and text as well as other features such as graphics. An "image output device" is a device that can provide output defining an image. A "display" or "display device" is an image output device that is capable of presenting information in human perceptible form. A display may, for example, include a cathode ray tube; an array of light emitting, reflecting, or absorbing elements; a device or structure that presents marks on paper or another medium; or any other device or structure capable of defining an image in a perceptible form. A "display area" is the portion of the display in which an image is presented or the medium which receives an image. Data "defines" an image when the data includes sufficient information for the processor to directly produce the image, such as by presenting the image on a display. Data defining an image may be referred to as "image definition data". The processor "presents" an image on a display when an operation executed by the processor produces image definition data defining the image and provides the image definition data defining the image to output circuitry connected to the display for display in the display area so that the image is perceptible to a system user.

The term "display feature" refers to any human perception produced by a display device, and includes a single display feature and also may include plural display features that together form a pattern of display features in an image. A "display object" or "object" is a display feature that is perceptible as a coherent unity. An image "includes" a display feature or object if presentation of the image can produce perception of the feature or object. Similarly, a display object "includes" a display feature if presentation of the display object can produce perception of the display feature.

Figure 1:
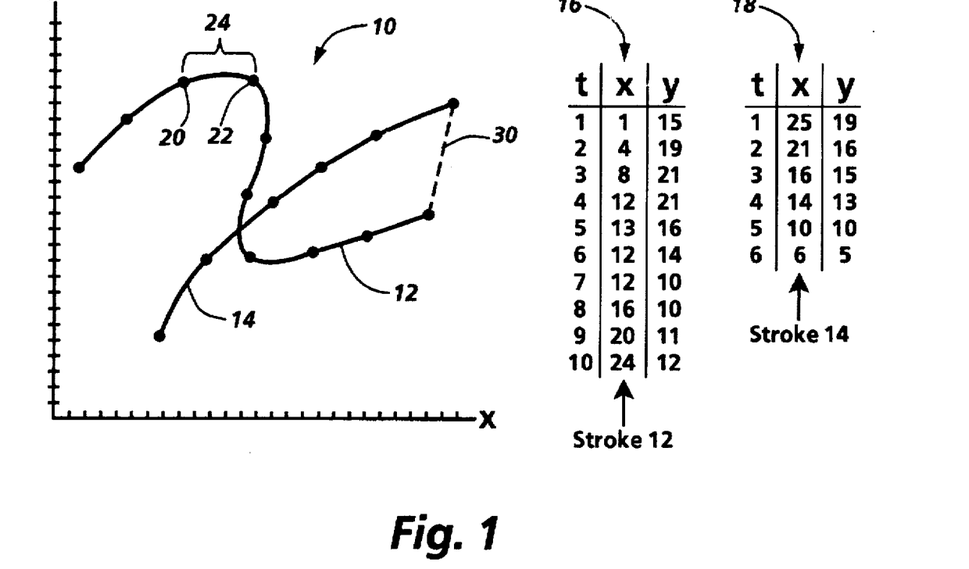
FIG. 1 illustrates a gesture and data based on a gesture.

A "gesture" is an expressive movement. FIG. 1 illustrates gesture 10, which resembles the English letter "x" or which could be an arbitrary graphical symbol. Data or a signal is "based on" a gesture when the data or signal includes information about the gesture's path of motion in space over an interval of time. For example, if information about the gesture's path includes only one point in time, the data or signal is not based on the gesture, but if information about one or more points of the path in space and the time interval of the point or points is included, the data or signal is based on the gesture. A simple example of data based on a gesture is data indicating the beginning and ending points in space of the gesture, and the time each occurred. More complete data based on a 2-dimensional gesture would be a vector of (x, y, t) 3-tuples obtained by sampling the x, y coordinates of the path of the gesture at a sufficiently high frequency to capture substantially all movement content provided by the gesture. An example of such data is shown in table 16 in FIG. 1. Data based on a gesture may include information about a gesture from which all or a portion of information related to the gesture's path of motion over time may be sensed, computed or derived, such as, for example, a gesture's acceleration or velocity. Additional component information about a gesture may also be captured, such as, for example, data representing the pressure, disturbances in resistance, or acoustic surface waves of the input device producing the gesture on a data collecting surface. Data or a signal based on a gesture is also referred to herein as "gesture-based data." A "gesture-based data structure" includes data or signals based on one or more gestures.

A "stylus" as used herein refers to a user input device capable of producing gesture-based data. For example, an electronic pen-like device is a stylus, and the movement of the tip of the stylus across a data collecting surface produces gesture-based data. A stylus may also include a conventional pointing device, such as a mouse, that is capable of producing data based on a gesture. In that case, the image of the cursor in the display area of the display device represents the location of the stylus, and the display area represents the data collecting surface. A stylus may also include pointing devices such as a system user's finger. A stylus, however, need not require a data collecting surface in order to produce gesture-based data. The term "electronic ink" or "digital ink" refers to the image on a display of the trace of the motion of a stylus tip, and is generally used to refer to an image of gesture-based data.

A "stroke" is the data or signal from a gesture or a portion of a gesture produced from the point in time the stylus is determined to be producing gesture-based data to a subsequent point in time when the stylus is determined not to be producing gesture-based data. For example, when a stylus produces gesture-based data by movement across a data collecting surface, a stroke is the data produced from the point in time the stylus is sensed to be in contact with the data collecting surface to the subsequent point in time the stylus is sensed not to be in contact with the data collecting surface. In FIG. 1, gesture 10 is shown as being comprised of two strokes 12 and 14.

Data are collected during the production of a stroke at regular time intervals, as illustrated by sample data points 20 and 22 in FIG. 1. A "stroke segment" or "segment" refers to the portion of a stroke between two time sample data points, as illustrated by segment 24. When the final (in time) sample data point of a first stroke 12 is connected to the first sample data point of a second stroke 14, the strokes or sample points are said to be "concatenated." Concatenation of sequences of sample points may result in the grouping of multiple strokes into a single stroke group. The effect of concatenating sample data points is to introduce a segment 30 into the sequence of sample data points.

A data structure including gesture-based data may also be referred to herein as an "unclassified" data structure, and is distinguishable from a "classified" data structure which includes enrolled data objects such as templates or prototypes used for the purpose of classifying target inputs.

B. General Features.

Figure 2:
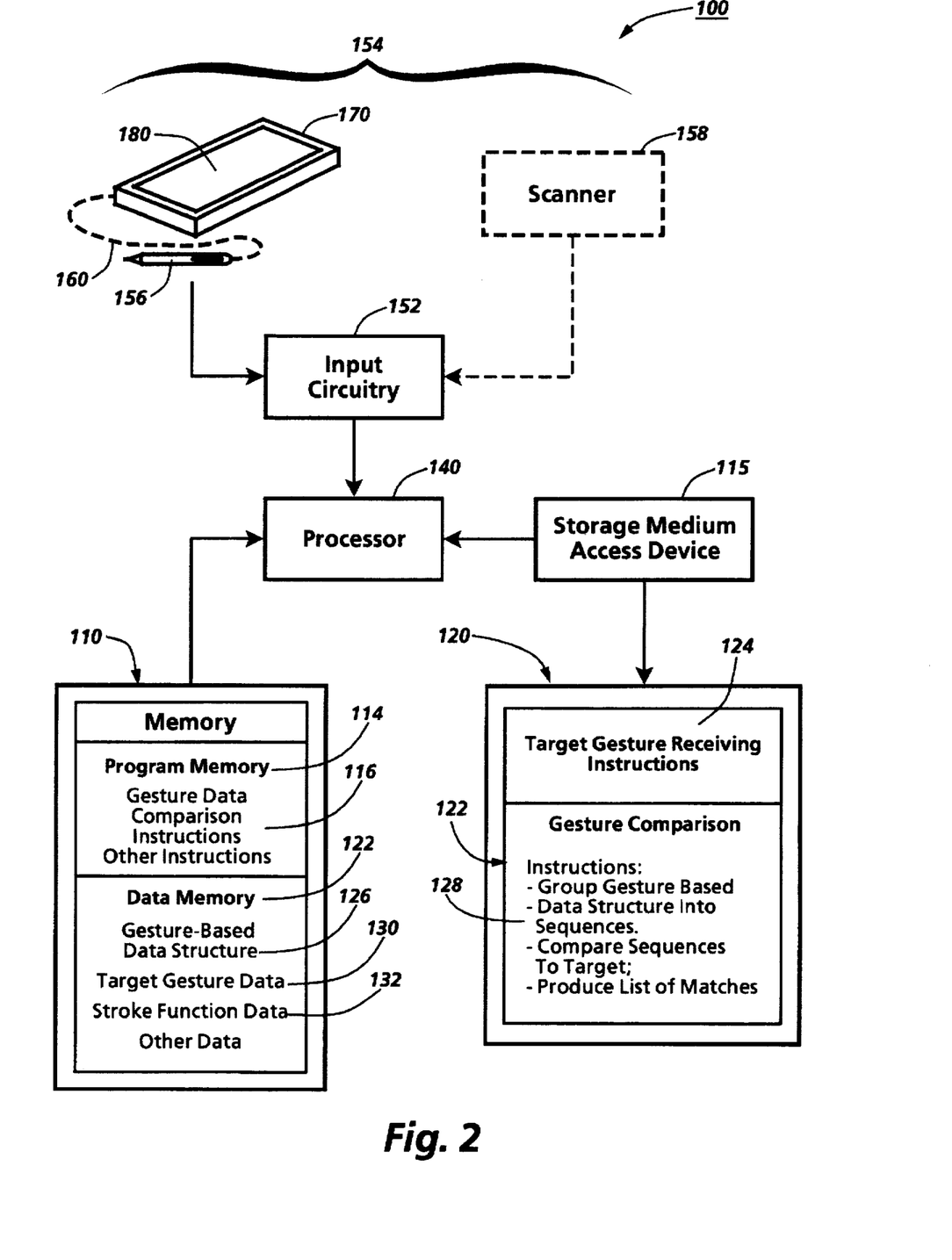
FIG. 2 is a simplified block diagram illustrating a system the present invention may operate and illustrating a software product in which the present invention may be implemented.
Figure 3:
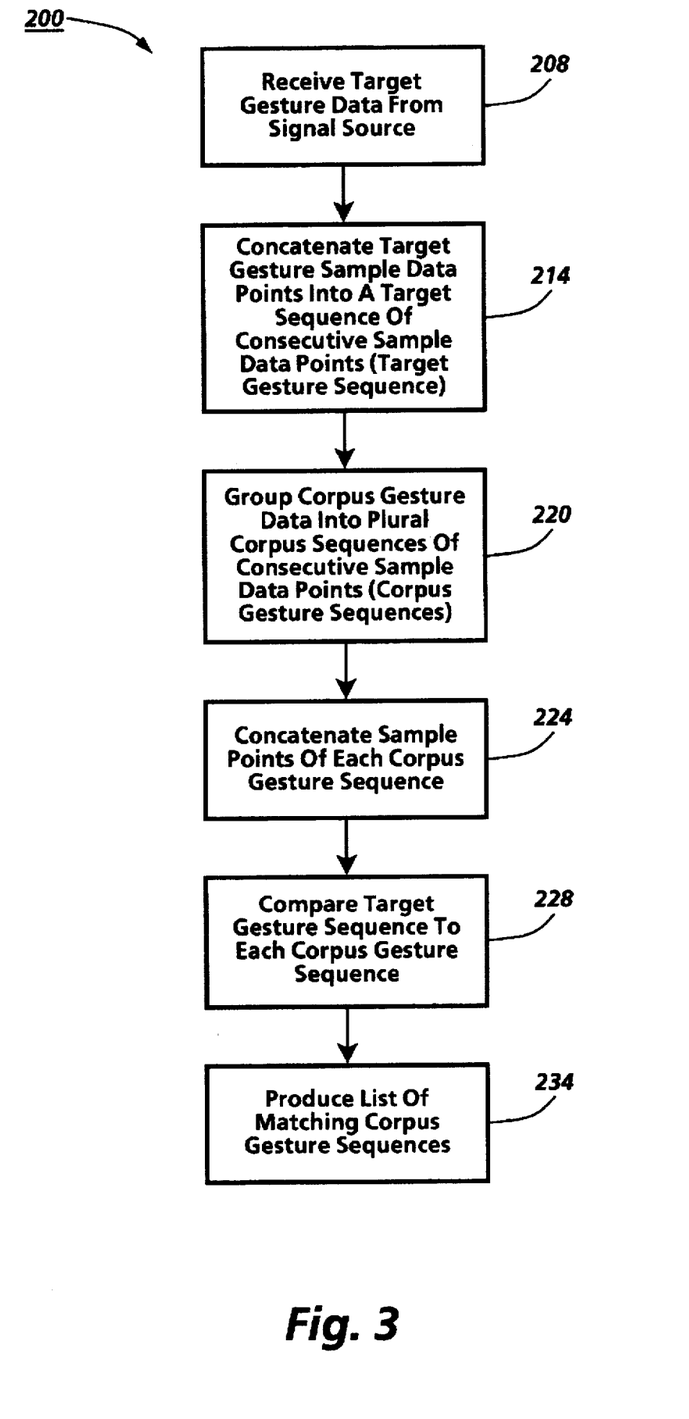
FIG. 3 is a flow chart illustrating the general steps of searching and matching gesture-based data according to the present invention.

FIGS. 1-3 illustrate the general features of the present invention. FIG. 1 illustrates concepts about the data signals that define a gesture, a stroke, a segment, sample data points, and concatenation of sample data points. FIG. 2 illustrates the system components of the system that the present invention may operate. FIG. 3 illustrates the general steps of the present invention.

1. The System of the Present Invention.

The present invention for searching and matching gesture-based data operates a processor-controlled system having the common components, characteristics, and configuration of system 100 illustrated in FIG. 2. System 100 includes input circuitry 152 for receiving signals from a signal source 154. Signal source 154 may include any signal producing source that produces signals of the type needed by the present invention. Such sources include input devices controllable by a human user that produce signals in response to actions by the user, such as a stylus device 156 that the user moves over the data collecting surface and display area 180 of device 170 when making gestures. Device 170 is commonly called an "electronic tablet," but as noted earlier, device 170 could also be a conventional display device capable of presenting images, or a stylus device 156 alone that is capable of producing gesture-based data without using a data collecting surface could be substituted for the combination of device 170 and stylus device 156. Stylus device 156 has circuitry (not shown) for controlling the interaction between the user and display features and objects presented in the display area 180 of device 170. For example, the pointing device may have buttons (not shown) which, when clicked or released, result in signals being sent through input circuitry 152, or there may be a pressure sensitive tip switch (not shown) which results in signals being sent through input circuitry 152 when the user presses the tip switch against data collecting surface and display area 180 when making gestures. Alternatively, signal source 154 may be an operation (not shown) that processor 140 is executing that provides data based on gestures as a target gesture to processor 140 for processing according to the present invention. Signal source 154 may also be an image scanning device 158 which produces signals defining an image of gestures which are sent through input circuitry 152. Processor 140 may then convert the image of gestures to data based on gestures using any one of a number of known techniques.

Processor 140 operates by accessing program memory 114 of memory 110 to retrieve instructions, which it then executes. Program memory 114 includes gesture data comparison instructions 116 that implement the invention described in the flowcharts of FIGS. 3, 4 and 5. During execution of instructions, processor 140 may access data memory 122 in addition to receiving input signals from input circuitry 152, and providing data defining images, for example, images of electronic ink to output circuitry (not shown) for presentation on device 170 in display area 180, or for presentation on any other suitable display device. In the description of the illustrated embodiment, the display area corresponds to the visible part of the display screen, and the method of the present invention provides for visibly displaying electronic ink therein. However, the present invention could also provide for displaying images in a virtual screen or presentation space for a window, or to the area of a buffer for printing or facsimile transmission or the like. Memory 110 also stores gesture-based data structure 126, target gesture data 130, and, in the case of the illustrated embodiment, stroke function data 132, as well as other data.

The actual manner in which the physical components of machine 100 are connected may vary, and may include hardwired physical connections between some or all of the components, such as shown by the dotted line wire connection 160 between stylus 156 and device 170, as well as connections over wired or wireless communications facilities, such as through remote or local communications networks and infrared and radio connections. Device 170, for example, may include output circuitry, input circuitry 152, memory 110, and processor 140 as a single physical unit, as is the case for the previously mentioned personal digital assistance devices. Or, memory 110 may include memory that is physically connected to processor 140 as local memory, or that is remotely accessible to processor 140 by means of a wired or wireless communications facility. It is further of importance to note that the range of the physical size of machine 100 may vary considerably from a very large device, for example, a large electronic "whiteboard" device for shared collaboration, to much smaller desktop, laptop, and pocket-sized or smaller display devices. The present invention is operable on all systems in this physical size range.

2. General Operation of the Present Invention.

FIG. 3 is a flow chart illustrating the general steps of the present invention. Note that in FIG. 3, and in the remainder of this description, the term "corpus" is used as a shorthand term to mean the gesture-based data structure that is being searched for comparisons to a target gesture. Target gesture data is received from a signal source, in box 208. As already illustrated in FIG. 1, a gesture may include one or more strokes, but, since there can be great variation among writers in the stroke patterns and spacings that make up the same target gesture, matching the target gesture data in its component stroke form to data based on gestures in the corpus at the single stroke level would be unlikely to produce useful results. Therefore, to reduce the matching errors that are introduced by this variability, the sequence of sample data points for each stroke of the target gesture data are concatenated, in box 214, into a sequence of consecutive sample data points, referred to hereafter as a "target gesture sequence." As noted above with respect to the discussion of FIG. 1, the effect of concatenating the sample data points of the target gesture data into a single sequence of connected sample points is to introduce a new segment between strokes. Conceptually, concatenation supports the notion that the target gesture is conceptually regarded by a user of the present invention to be a single unit of data to be matched against the corpus, regardless of whether the target gesture has been actually provided in the form of a single or multiple strokes.

The gesture-based data structure, or corpus, being searched may be any collection of data based on gestures that is stored in memory 110 (FIG. 2) or otherwise accessible to processor 140 (FIG. 2). Any data structures of data based on gestures representing handwritten notes, letters, logs, diaries, calendars and other documents may become a corpus to be searched. The corpus may be viewed as simply a consecutive stream of sample data points representing the path of motion over time of many gestures; the data stream may be organized into lists of strokes, but need not be. In order to permit the matching of a target gesture sequence to the gesture-based corpus data, sets of sample data points in the corpus are identified and grouped into sequences of sample data points referred to hereafter as "corpus gesture sequences," in box 220. It is important to note that any one corpus gesture sequence of sample data points may overlap with, or share sample data points in common with, another corpus gesture sequence of sample data points. A corpus gesture sequence is any subset of sample data points in the corpus and may be as small as two sample data points. Each corpus gesture sequence is concatenated, in box 224, into a single data unit, or signal, for comparison purposes.

In box 228, the target gesture sequence is compared to each corpus gesture sequence to determine whether there is a match. Any suitable signal matching process may be used for this purpose; an example of a novel signal matching process based on dynamic time warping techniques is presented in detail below, and additional examples of matching processes are described in Section C.3 below. The results of the matching process of the target gesture sequence against all corpus gesture sequences are then produced, in box 234, and comprise, minimally, a list indicating the corpus gesture sequences that match the target gesture sequence and including, for example, the indices of the starting and ending sample data points of each matching corpus gesture sequence in the corpus, $(i_{start}, i_{end})$. The list may be used for a variety of further purposes, including but not limited to simultaneous or later reporting to a human user, typically by displaying the matching results in an image, or to another system operation, or passing a list of matching corpus gestures, or pointers to matching corpus gestures, for further processing by a subsequent operation. The list of matches may be empty, if no match occurs.

B. An Implementation.

An embodiment of the method of the present invention has been implemented as a software program on an Apple Macintosh® Model IIfx computer running the System 7 operating system, available from Apple Computer, Inc., of Cupertino, Calif. The software program is written in a standard version of the C++ programming language in conjunction with the Apple MacApp class library, using a compiler available from Apple. This pen-based embodiment utilizes a Wacom Handwrite Digitizer (model HD-648A) and attached stylus for the producing gesture-based data, available from Wacom Technology Group, 501 SE Columbia Shores Blvd #300, Vancouver, Wash. 98661. The Wacom digitizer interfaces with the Macintosh IIfx through a serial line protocol developed by Wacom.

The description of the illustrated implementation that follows presumes a knowledge of dynamic programming and dynamic time warping (DTW) techniques. One of many useful texts in this regard is *Time Warps, String Edits, and Macromolecules: The Theory and Practice of Sequence Comparison*, D. Sankoff and J. Kruskal, eds., Addison-Wesley Publishing Co., 1983. Of particular interest in this text is Chapter 4, at pg. 125, by J. Kruskal and M. Liberman, entitled, "The Symmetric Time Warping Problem: From Continuous to Discrete." The disclosure of this chapter is hereby incorporated herein by reference as if set out in full. Two journal articles discussing dynamic time warping techniques as applied to spoken word recognition are also of particular interest for setting forth discussions of design, optimization and efficiency issues with respect to the design and implementation of the mathematical model which represents the gesture-based data for the signal comparison process in the illustrated implementation. These articles are: "Performance Tradeoffs in Dynamic Time Warping Algorithms and Isolated Word Recognition," by C. Myers, L. Rabiner, and A. Rosenberg, in *IEEE Transactions on Acoustics, Speech, and Signal Processing*, Vol. ASSP-28, No. 6, December, 1980, at pp. 623–634; and "Dynamic Programming Algorithm Optimization for Spoken Word Recognition," by H. Sakoe and S. Chiba, in *IEEE Transactions on Acoustics, Speech, and Signal Processing*, Vol. ASSP-26, No. 1, February, 1978, at pp. 43–49. The disclosures of each of these articles are hereby incorporated herein by reference as if set out in full herein.

Figure 4:
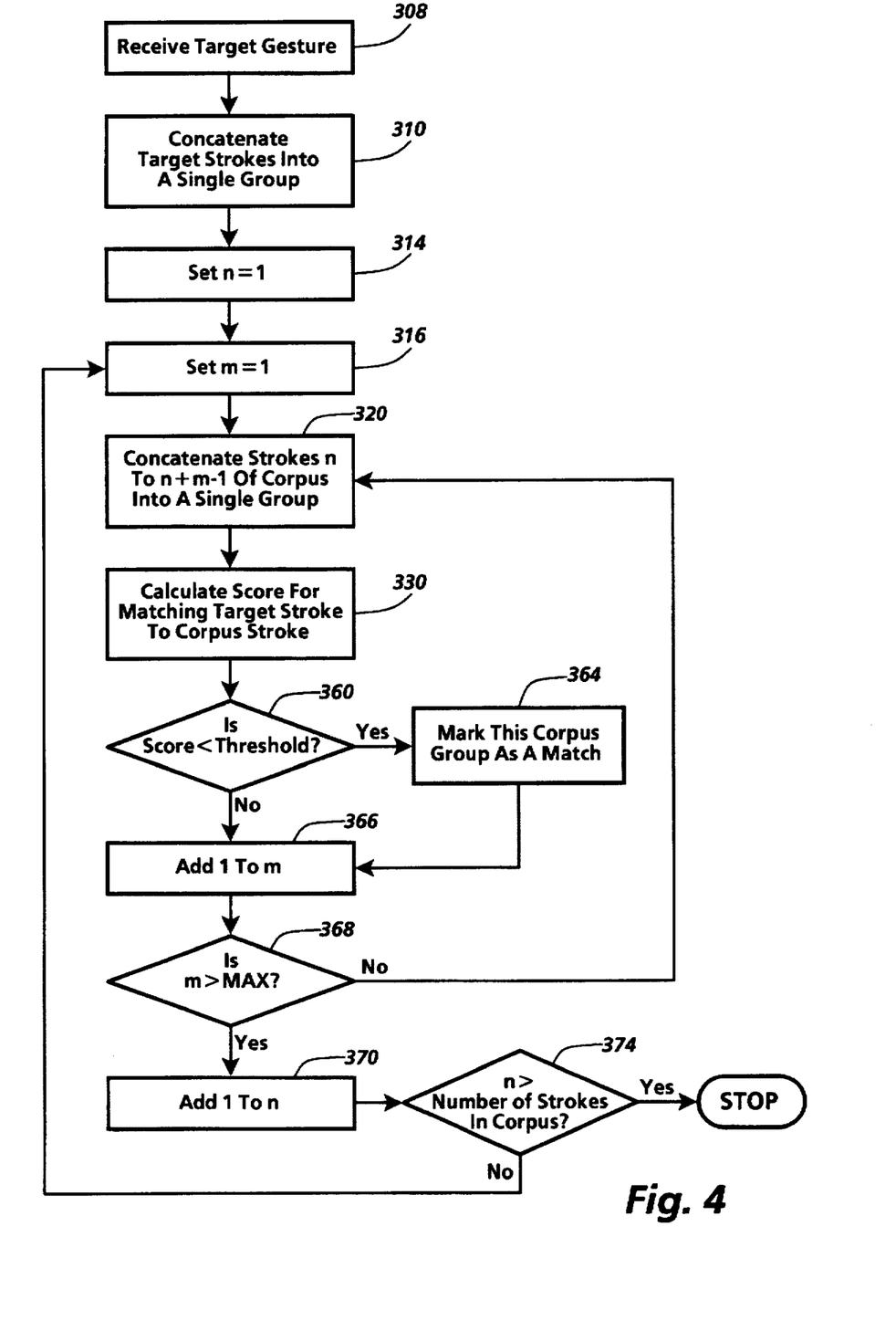
FIG. 4 is a flow chart illustrating the steps of matching a target gesture group to gesture-based data groups in a gesture-based data structure according to a software implementation of the present invention.
Figure 5:
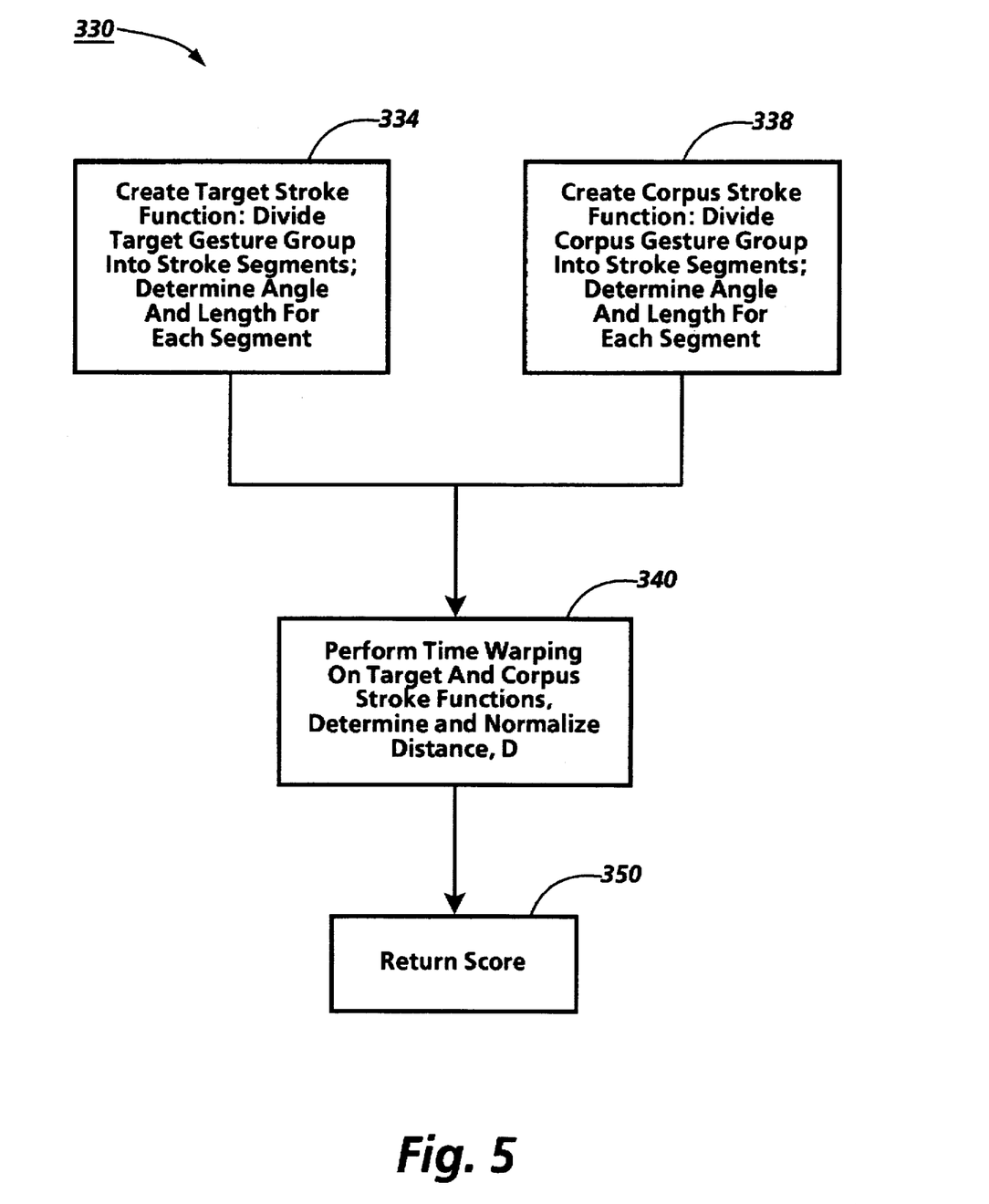
FIG. 5 is a flow chart illustrating the substeps of the signal comparison step illustrated in FIG. 4, according to the illustrated implementation of the present invention.
Figure 6:
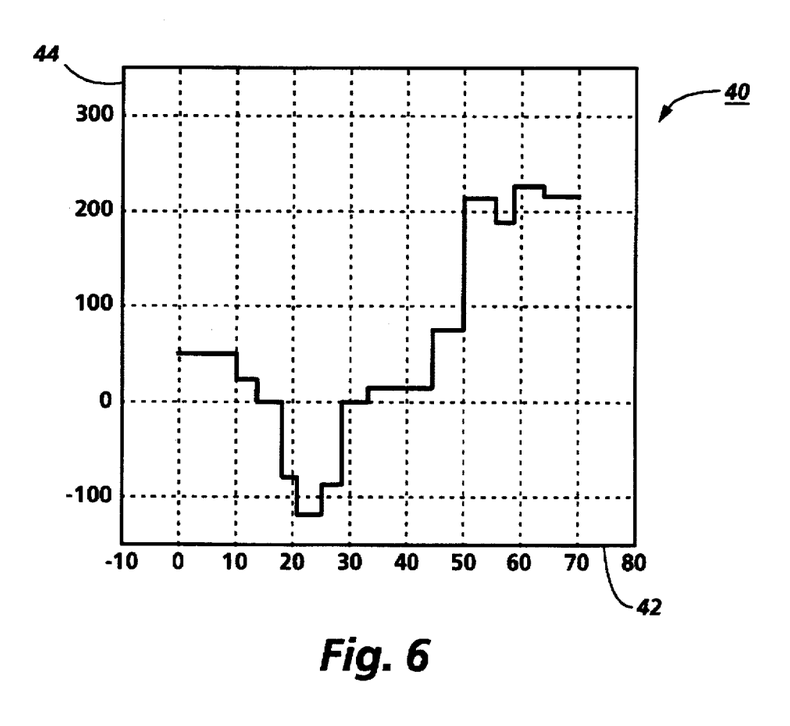
FIG. 6 is a graph of an exemplary stroke function, constructed for the gesture of FIG. 1, for use in the signal comparison process of FIG. 5, in accordance with this invention.

FIGS. 4-6 illustrate the features of the illustrated implementation of the present invention. FIG. 4 illustrates the steps of the illustrated implementation for matching a target group of strokes to a group of corpus strokes, and FIG. 5 illustrates the implementation of the signal comparison process in more detail. FIG. 6 illustrates a graph of a stroke function of the type used in the signal comparison process of the illustrated implementation.

1. Grouping Strokes For Matching.

FIG. 4 is a flow chart illustrating the sequence of steps implemented by the program code of the embodiment of the present invention. In the illustrated embodiment, the gesture-based data in both the target and corpus is organized into a list of strokes, each stroke being a list of sample data points, as illustrated in FIG. 1. In box 308, data indicating a target gesture is received from a signal source. In box 310, the target gesture data is examined to determine if it includes more than one stroke, and, if it does, each $stroke_i$ is concatenated with a subsequent $stroke_{i+1}$ until all strokes have been concatenated into a single sequence of consecutive sample data points by connecting the last sample point of $stroke_i$ (the stroke first in time) with the first sample point of the $stroke_{i+1}$ (the stroke next in time).

In box 314, a counter, n, for counting the strokes in the corpus is initialized to one. When all strokes in the corpus have been compared to the concatenated target stroke data, an inquiry that is made in box 374, processing for this target is complete. In box 316, a grouping counter m is initialized to one; grouping counter m controls the grouping of the strokes in the corpus for input into the matching process. Starting from each single stroke in the corpus, as counted by counter n, and beginning with grouping counter m at one, corpus strokes n to n+m−1 are grouped into a single sequence of consecutive sample data points and concatenated, in box 320, before being input into signal comparison process 330, until m has reached a maximum number of grouping strokes, which is tested in box 368. The maximum value for grouping counter m may be determined heuristically after experimenting with various types of corpora produced by the same or by different writers. Alternatively, the maximum value for grouping counter m may be a function of the number of strokes, s, in the target gesture data. In the illustrated implementation, grouping counter m is a function of s, and its maximum value is equal to s+2.

This implementation of the concept of grouping leads to a brute force signal comparison of groups of corpus strokes to the concatenated target gesture data that attempts to account for variations among writers that result from inconsistent and different stroke spacing. More importantly, this approach does not depend on the ability of the system to divide the corpus into discrete semantic units, such as word or graphical symbols, in advance of searching and matching. Such a brute force comparison method, however will have a substantial impact on computational efficiency. Grouping counter m is a processing and performance efficiency control. In theory, given a corpus the size of k strokes, at a point n in the sequence, the value of m could range from 1 to k−n+1, and strokes would then be grouped into sequences as large as the entire corpus to ensure that the maximum number of stroke sequences are input to the signal comparison process. In the illustrated implementation, a target gesture with a stroke count, s=3 would result in 5 corpus gesture sequence group, ranging from 1 stroke to 5 consecutive strokes (when the maximum value of m=s+2), each group being compared to the target gesture, for each stroke in the corpus.

It can be seen that a variety of different approaches can be used to determine grouping by altering either or both of the initial values for group counter m and its maximum value. For example, group counter m, could be initialized to s−1, and it's maximum value could be established at s+1, so that only groupings one stroke less than the target, equal to the target, and one stroke greater than the target are formed for comparison with the target. Grouping counter m has to be selected carefully enough to ensure that a target gesture with a small number of strokes will be successfully matched with corpus gesture sequences having a larger number of strokes, which might occur when a target composed of substantially cursive handwriting needs to be matched to a corpus composed of substantially printed handwriting. It may also be possible to mathematically relate the maximum value of group counter m to the threshold score returned from the signal comparison process such that further grouping of corpus strokes and matching to the target would be unlikely to yield a score below the threshold. Such a relationship could be used to improve computational efficiency during the matching process.

Signal comparison process 330, described in more detail below, returns a score that measures how well the concatenated target gesture data compared with a particular group of concatenated corpus strokes. This score is evaluated against a threshold score, in box 360, and if it compares favorably—in this case, if the score is less than the threshold—the group of concatenated corpus strokes is marked as a match. Marking in this sense simply refers to any system action taken in response to finding a matching corpus gesture sequence. In the illustrated embodiment, the corpus being searched is displayed for a user on an electronic tablet. As each match of the concatenated target gesture sequence is encountered in the corpus, a box-shaped display feature is added around the portion of the image of the corpus representing the matching corpus gesture sequence, and when the next render-image instruction (e.g., paint-image or display-image instruction) is executed, the system presents an image of the corpus that includes the matching corpus gesture sequences with boxes surrounding them.

If the score resulting from signal comparison process 330 does not compare favorably to the threshold, and after a successful match is marked, grouping counter m is incremented, in box 366, in order to form the next group of corpus strokes. If grouping counter m is not greater than its maximum, the next group of strokes in the corpus is identified and concatenated, in box 320, in preparation for signal comparison with the target gesture group.

When grouping counter m is greater than its maximum, corpus stroke counter n is incremented, in box 370, tested against the number of strokes in the corpus to determine if all corpus strokes have been compared, and, if not, grouping counter m is reset to one in box 316 in order to begin a new iteration of grouping with the next consecutive stroke in the corpus.

The threshold represents the cutoff in the score of a signal comparison that determines that the target gesture sequence and a corpus gesture sequence match sufficiently enough to report as a match, and is, to a large extent, a function of the design decisions made with respect to the implementation of signal comparison process 330, such as, for example, how normalization is done. In contrast to recognition systems that use a lowest score to indicate a successful comparison, the threshold is somewhat a subjective and arbitrary assessment of how many false positives will be tolerated by the system or system user. In this illustrated implementation, the value of the threshold has been determined empirically, and a threshold of 0.4 has been used that results in substantially reducing false positives without unduly increasing false rejections.

The present invention implemented as shown in FIG. 4 determines all occurrences of a matching target gesture in a gesture-based data structure. It can be seen, however, that the steps in FIG. 4 can be easily modified to count successful matches of the target gesture, and to stop after some predetermined number.

2. Signal Comparison Using Dynamic Time Warping Techniques.

In the illustrated implementation, signal comparison process 330 uses a mathematical comparison technique known as dynamic time warping (DTW), which refers to the comparison of trajectories, which is defined to be a continuous function of time in multidimensional space. The basic idea of time warping is that replications of the same trajectory will trace out approximately the same curve, but with varying time patterns. Time warping techniques compare sequences derived from trajectories by time sampling, when each trajectory is subject not only to alteration by the usual additive random error but also to variations in speed from one portion to another. Such variation in speed appears concretely as compression and expansion with respect to the time axis, and is referred to as compression-expansion. Time warping deals with such variation, and can be used to measure how different two sequences are in a way that is not sensitive to compression-expansion but is sensitive to other differences.

The illustrated implementation of the present invention applies the concepts of time warping to the domain of the gesture or stroke, which can be said to be a trajectory. The variation among writers that is of major interest is the variation that results from differences in stroke shapes; these variations are captured in the angles and distances between sample data points, and, in this domain, the "stroke trajectory" of a sequence of sample points is actually a function, hereafter called a "stroke function," that relates the orientation of a segment to the cummulative length of previous segments. In the literature this type of representation is often called the "orientation" function or the "orientation versus arc length" function. An example of a stroke function is shown in FIG. 6, in which graph 40 shows the stroke function for the concatenated strokes of gesture 10 in FIG. 1. In graph 40, the cummulative length at each stroke segment of concatenated strokes 12 and 14 (FIG. 1) along the horizontal axis 42 of graph 40 is plotted against the segment's angle on the vertical axis 44 of graph 40. The stroke function in graph 40 is a example of the target and corpus stroke functions that are input to the DTW comparison process.

In the mathematical sense, the idea of time warping is to establish a correspondence between each point in the target stroke function and some specific point in the corpus stroke function, by warping the time axis of each stroke function and establishing a mapping between points in the two stroke functions. Two time warpings are equivalent if they induce the same linking throughout the entire two stroke functions. The distance, D, between two stroke functions is the normalized integral, or summation in the discrete case, of weighted pointwise distances, d, between points brought into correspondence by the warping which minimizes this integral or sum. The distance, D, serves as the matching score, or measure of the similarity, for a target gesture group and the current corpus gesture group. The normalization referred to is based on the length of the warped sequences. An example of a pointwise distance metric $d(x,y)$ is $d(x,y) = |x-y|$.

FIG. 5 illustrates the detail substeps of the DTW signal comparison process in box 330 of FIG. 4. The stroke functions for the target gesture group and the current corpus gesture group are constructed, in boxes 334 and 338, by dividing the target gesture group and the current corpus gesture group into segments and then calculating the length and angle of each segment. For efficiency, the previous segment list for the target gesture group and for the previous corpus gesture group are stored and reused where possible. The list of segments, angles and lengths for each of the target gesture and corpus gesture groups will include those for the segment that was added as a result of the concatenation in boxes 310 and 320 (FIG. 4.) Use of the dynamic time warping technique minimizes the impact on accuracy of adding a segment to a stroke group as a result of concatenation, since the correspondence of segments between stroke functions can be adjusted to de-emphasize the added segment when its length and angle differ substantially from that of a corresponding segment.

Time warping is then performed on the stroke functions, in box 340, and the distance score is computed and normalized. The score is then returned for testing against the threshold in box 360 of FIG. 4.

Appendix A (©1994, Xerox Corporation) below provides a source code listing implementing the features of the illustrated implementation shown in FIG. 5. The code in Appendix A, when executed on a Macintosh, generally follows the implementation described in relation to FIG. 5. Nonetheless, the code may differ from the above description in various ways. For example, the code may be divided into procedures or routines differently than described or illustrated.

C. Additional Considerations.

1. Variations and Additions.

Several additional steps may be added to the method described in the illustrated implementation of FIG. 4 in order to improve the matching accuracy or to optimize the performance of the method. One such step involves adding a stroke preprocessing step to the preparation of the respective target and corpus strokes for the signal comparison step. A stroke preprocessing step, which is, in effect, a noise removal step, would detect and remove stroke or segment irregularities that are likely to result from environmental factors, such as deficient circuitry in the electronic tablet or stylus, rather than from intentional movement by the user. Such a preprocessing step may be accomplished using known techniques, such as those described in C. C. Tappert, "Speed, Accuracy, Flexibility Trade-Offs in On-Line Character Recognition," in an IBM Research Report, RC 13228 (#59158), October, 1987 (hereafter, "the Tappert Research Report".)

Another technique that may be incorporated into the present invention is that of resampling the stroke data points. The existing sampling rates of some electronic tablets may produce too many sample points, and thus segments, for a particular signal comparison process. A resampling step applied to both the target and corpus gesture groups could be implemented in a variety of ways. For example, redundant sample points could simply be removed, or the original sample points could be replaced with a new set of sample points that approximates the original curve and removes the redundant sample points that cause excessive computation time. Resampling techniques are also known in the art, and may be accomplished using any known technique, such as those described in the Tappert Research Report.

Resampling may also be used to represent strokes more uniformly. One such resampling technique was implemented in an earlier version of the implementation of the present invention illustrated in FIG. 4, in which strokes were resampled to produce fewer sample points that were equidistant from each other, resulting in an improvement in processing time, but having little or no observable effect on matching accuracy.

The gesture-based data structure that is searched for a data unit that matches the target gesture need not exclusively include data based on gestures, but may include data indicating other types of information, such as characters and text, and data indicating graphical objects, so long as this data is somehow able to be differentiated from the data based on gestures. Some systems that accept gestures as well as conventional keyboard data or data signals from a pointing device such as a mouse in a non-gesture mode tag data with an identifying data item that distinguishes one type of data from another. The present invention could be easily adapted to provide the searching and matching capability for data tagged as being based on gestures.

The present invention also contemplates using a scanned image of handwriting as the original source of the corpus, or for specifying a target, or both. Known methods exist for converting a bit-mapped image of handwriting symbols into data based on a gesture. The conversion step would simply precede the general steps illustrated in FIG. 3. This would mean that images of handwriting received via facsimile transmission, for example, could be converted to data based on gestures and stored for later searching.

2. Interaction With a System User.

The present invention may be included as part of the functionality and user interface of any PDA device so that a user of the device would be able to search handwritten corpora. In this case, the signal source would be the stylus device used by the user to select a corpus for searching, enter a target gesture to be matched, and initiate the search, and the search would be performed in response to the user's search request signal.

A feature is also provided that permits the system user to select the target gesture to be matched from the corpus to be searched, or from another corpus. An image is displayed of the electronic ink representing all or a portion of the corpus to be used for target selection, and, using the stylus, the user makes a selection gesture indicating the portion of the electronic ink that represents the gesture-based data that are to be used as the target gesture-based data. In response to the selection gesture, the selected gesture-based data is retrieved from the corpus for processing as the target gesture-based data according to the steps illustrated in the flowcharts of FIG. 3 or 4. This feature may be used by a first writer to search the contents of a corpus written by a second writer for a target gesture that exists in the corpus to be searched and that was originally written by the second writer, rather than having the target re-entered as gesture data by the first writer. This takes advantage of potential writing style consistencies between the gestures in the target and the corpus.

3. Other Grouping and Signal Comparison Processes.

Another grouping process that has been implemented groups the corpus into semantically meaningful units. These units are then used as the corpus gesture sequences to which the target gesture-based data are compared during the matching phase. In this implementation, these units are intended to correspond to individual words of a written document. Semantic grouping of the corpus is implemented by first searching through the strokes of the corpus to find horizontal spaces between strokes that are at least half as large as the average vertical size of the strokes in the corpus. Then, semantically-based corpus gesture sequences that could be considered to be roughly equivalent to words, are identified as the sample data points of the strokes that are between the large horizontal spaces.

The technique of grouping corpus sample points into semantically meaningful units has been empirically determined to be more computationally efficient than the grouping process illustrated in FIG. 4. However, searching accuracy in this grouping technique depends on whether, or how well, the technique employed to determine the groups controls for stroke spacing variations among writers, which is not a factor in the grouping technique described in FIG. 4. In this implementation, it was found that mistakes introduced in making the groups reduced accuracy below an acceptable threshold for many of the corpora tested. However, this grouping technique is likely to work well searching a corpus produced by a writer with a very uniform stroke spacing style, and would benefit from improvements in the semantic grouping process that provided for the handling of stroke spacing variations.

As a further technique to potentially improve signal comparison accuracy, the order of the concatenated gestures of either the target gesture or those provided from the gesture-based data structure, or both, may be changed prior to performing the signal comparison, to account for other writer variations, for example in the order of crossing letters such as "f" or "t".

Another signal comparison process that may be used in conjunction with the present invention is the known technique of simple signal correlation. Correlation also uses a stroke function derived from the sample point sequence formed from the concatenated strokes of the target gesture. The stroke function is correlated with a stroke function derived from the sequence of sample data points in the corpus. Subsequences in the corpus stroke function where this correlation value is high indicate places where there is a good match. In place of pointwise multiplication used in basic correlation, the pointwise absolute difference may be used instead, in a manner similar to that used in the dynamic time warping technique of the illustrated embodiment. Correlation is described, for example, in Chapter 2 in the book by Oppenheim and Schafer entitled *Discrete-Time Signal Processing*, Prentice-Hall, 1989, which is hereby incorporated by reference herein as if set out in full.

Still another signal comparison process that may be used in conjunction with the present invention is the technique known as matching based on the Hausdorff distance. Hausdorff matching is a technique for measuring how well two groups of 2D points differ from each other. As applied to the sample data points that comprise gestures, the sample data points of the target gesture, taken as points in the plane, would be compared against groups of sample data points from the corpus, again taken as points in the plane. An example of a Hausdorff matching method that may be used for this purpose is described in detail in Huttenlocher, et al., "Comparing Images Using the Hausdorff Distance," in *IEEE Transactions on Pattern Analysis and machine Intelligence*, Vol.15, No. 9, September, 1993, pp. 850–863, which is hereby incorporated by reference herein as if set out in full.

4. The Software Product of the Present Invention.

The present invention may be implemented as a software product for use in operating systems such as those of the configuration shown in FIG. 2, and described in the discussion accompanying FIG. 2 above. FIG. 2 shows software product 120, an article of manufacture that can be used in a system that includes components like those shown in FIG. 2. Software product 120 includes data storage medium 122 that can be accessed by storage medium access device 115. Data storage medium 122 could, for example, be magnetic medium such as a set of one or more floppy disks, an optical medium such as a set of one or more CD-ROMs, or any other appropriate medium for storing data. Data storage medium 122 stores data 124 and 128; storage medium access device 115 can provide data 124 and 128 to processor 140. Stored data 124 and 128 include data indicating target gesture receiving input instructions 124, which can be executed to perform the steps in boxes 208 and 214 in FIG. 3 for receiving signals representing the target gesture. The stored data also include data indicating comparison instructions 128, which can be executed to perform the steps in boxes 220 through 234 in FIG. 3 for grouping the gesture based data structure into units for comparison and comparing each group to the target gesture data.

The present invention provides a novel technique for extending the usefulness and functionality of systems that accept gestures as input by providing a gesture matching and searching capability that does not depend on handwriting recognition. The illustrated implementation provides reasonably accurate matching capability when the target gesture and the gesture-based data structure both represent handwriting that is stylistically similar in features such as letter shapes and connectivity, and stroke direction. Because of severe stylistic dissimilarities in English, the illustrated implementation may not provide acceptable accuracy in matching, for example, a target gesture comprised of printed capital letters with gestures comprised of lower case cursive handwriting in a gesture-based data structure. On the other hand, when a single writer exhibits stylistic consistency when using a gesture-based system, or when a group of writers follow similar writing conventions, the invention is likely to demonstrate a very acceptable accuracy level. Moreover, when the target gesture is selected by a first writer from existing gestures in a gesture-based data structure prepared by a second writer for searching in that data structure for additional matching occurrences, writer variations between the first and second writers are eliminated entirely.

The novel technique operates on a gesture-based data structure that is wholly unclassified, in the sense that it is a sequence of signals that is undifferentiated as to content, and it is not a data structure of templates or prototypes to which a target is to be specifically classified. The technique of the present invention may be used independently of any semantic content component of the handwriting or gestures that are processed, although refinements and improvements to the technique may, but need not, make use of language characteristics to improve accuracy.

While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

---

APPENDIX A

```
//Copyright Xerox Corporation, 1994. All rights Reserved.
// Dynamic Programming Table
// Each cell(i,j) in the table represents the minimum cost of getting to
the point
// where segment i of StrokeA is matched with segment j of StrokeB
// E.g., looks like:
//   a3                *
//   a2           *
//   a1      *    *
//   a0 *
//      b0   b1   b2   b3   b4
float *DPT = NULL;
// Helper function for CompareStrokes1. Given two segment lists (signals),
//    and a cell to fill in, fills in that cell using DTW techniques.
//    Also returns the value that was filled in.
// Does it recursively so that we can implement local constraints as
described in Myers's paper.
// Uses Type I Constraints.
float GetMinimumDTWRecursive1(TList *SegmentListA,
TList *SegmentListB,
int
i, int j, int numA) {
    // 1st; get the relevant values. Use i + 1 and j + 1 because the lists
    are indexed from 1 ... n
    float AngleA = ((Segment*)(SegmentListA→At(i + 1)))→theAng;
    float AngleB = ((Segment*)(SegmentListB→At(j + 1)))→theAng;
    float LengthA = ((Segment*)(SegmentListA→At(i + 1)))→theLength;
    float LengthB = ((Segment*)(SegmentListB→At(j + 1)))→theLength;
    float AngleAp, AngleBp, LengthAp, LengthBp;
    if (i>0) {
        AngleAp = ((Segment*)(SegmentListA→At(i)))→the Ang;
        LengthAp = ((Segment*)(SegmentListA→At(i)))→the Length;
    }
    if (j>0) {
        AngleBp = ((Segment*)(SegmentListB→At(j)))→the Ang;
        LengthBp = ((Segment*)(SegmentListA→At(j)))→the Length;
    }
    // 2nd, go through each of the 3 cases (4 if you include the base case)
    //    and set BestScore to the smallest of the three
    float WestScore;
    float SouthWestScore;
    float SouthScore;
    floatBestScore = -1;
    // Base Case;.
    if ((i = = 0) && (j = = 0)) {
        BestScore =
pow(AngleDiff(AngleA,AngleB),gPower)*((LengthA + LengthB)/2);
    }
```

APPENDIX A
-continued

```
    // Calculate WestScore;
    if ((j>1) && (i>0)) {
        WestScore = DPT[i-1+(j-2)*numA];   // 1st try DTW
table; if not yet set, then calculate
        if (WestScore = = -1) WestScore =
GetMinimumDTWRecursive1(SegmentListA, SegmentListB,
i-1, j-2, numA);
        if (WestScore ! = -2) {
            Westscore + =
pow(AngleDiff(AngleA,AngleB),gPower)*((0 + LengthB)/2) +
Low(AngleDiff(AngleA,AngleBp),gPower)*((LengthA + LengthBp)/2);
            if ((BestScore = = -1) || (WestScore < BestScore))
BestScore = WestScore;
        }
    }
    //Calculate SouthWestScore;
    if ((i>0) && (j>0)) {
        SouthWestScore = DPT[i-1 + (j-1)*numA]; // 1st try DTW
table; if not yet set, then calculate
        if(SouthWestScore = = -1)SouthWestScore =
GetMinimumDTWRecursive1(SegmentListA, SegmentListB,
i-1, j-1, numA);
        if SouthWestScore ! = -2) {
            SouthWestScore + =
pow(AngleDiff(AngleA,AngleB),gPower)*((LengthA + LengthB)/2);
            if ((BestScore = = -1) || SouthWestScore <
BestScore)) BestScore = SouthWestScore;
        }
    }
    // Calculate SouthScore;
    if ((j>0) && (i>1)) {
        SouthScore = DPT[i-2 + (j-1)*numA]; //1st try DTW
table; if not yet set, then calculate
        if (SouthScore = = -1)SouthScore =
GetMinimumDTWRecursive1(SegmentListA, SegmentListB,
i-2, j-1, numA);
        if (SouthScore ! = -2) {
            SouthScore + =
pow(AngleDiff(AngleA,AngleB),gPower)*((LengthA + 0)/2) +
pow(AngleDiff(AngleAp,AngleB),gPower)*((LengthAp+LengthB)/2);
            if ((BestScore = = -1) || (SouthScore < BestScore))
BestScore = SouthScore;
        }
    }
    // 3rd, if BestScore is still -1, then we couldn't go backwards
    anywhere so make it -2 to signify that
    if (BestScore = = -1) BestScore = -2;
    // 4th, setDPT[i][j] and return it
    DPT[i+j*numA] = BestScore;
    return BestScore;
}
// Compares two strokes, and returns a closeness measure. The more two
strokes match
// the smaller the closeness measure. A closeness measure of 0 means the
two strokes
// match perfectly.
//Uses Dyanamic Time Warping and Dynamic Programming
// This allows the two strokes to stretch and shrink with respect to one
another
// in order to match.
// Returns -1 if punted.
#pragma setgment AMatch
float CompareStrokes1(Stroke* StrokeA, Stroke* StrokeB,Boolean
standardize, Boolean tryReuse) {
    // 1st, use static variables to see if the same strokes are coming
through
    static Stroke *LastStrokeA = NULL;
    static Stroke *LastStrokeB = NULL;
    static TList *SegmentListA = NULL;
    static TList *SegmentListB = NULL;
    // 2nd, see if we can reuse either segment list rather than having to
    // generate the segment lists over again
    Boolean reUseA, reUseB;
    ReUseA = (LastStrokeA = = StrokeA) && (tryReuse);
    ReUseB = (LastStrokeB = = StrokeB) && (tryReuse);
    LastStrokeA = StrokeA;
    LastStrokeB = StrokeB;
    // if both Strokes are NULL, then it's a signal to reset and not to
```

APPENDIX A

```
do a comparison
    if ((StrokeA = = NULL) && (Stroke B = = NULL)) {
        if (SegmentListA) SegmentListA→FreeList();
        SegmentListA = NULL;
        if (SegmentListB) SegmentListB→FreeList();
        SegmentListB = NULL;
        return 0;
    }
    // 3rd, make segment lists for the two strokes if we need to
    if (SegmentListA = = NULL) {
        SegmentListA = NewList();
        SegmentListA→SetEltType("/pSegment");
    }
    if (SegmentListB = = NULL) {
        SegmentListB = NewList();
        SegmentListB→SetEltType("/pSegment");
    }
    // 4th, fill in segment lists for each stroke if we can't reuse it
    // A
    if (reUseA = = false) {
        if (SegmentListA) SegmentListA→FreeAll();
        Stroke* StrokeToUse;
        if (standardize) {
            int num_segs = (int)(StrokeA→arc_length / 6);
            if (num_segs = = 0) num_segs = 1;
            StrokeToUse =
StrokeA→GetFixedNumberOfSegmentsStroke(num_segs,false);
            // StrokeToUse = StrokeA→GetPolygonizedStroke(3,true);
        } else StrokeToUse = StrokeA;
        StrokeToUse→SimpleSegments(SegmentListA);
        // StrokeToUse→Segments(6,RAD_70,SegmentListA);
        if (standardize) StrokeToUse→Free();
    }
    // B
    if (reUseB = = false) {
        if (SegmentListB) SegmentListB→FreeAll();
        Stroke* StrokeToUse;
        if (standardize) {
            int num_segs = (int)(StrokeB→arc_length / 6);
            if (num_segs = = 0) num_segs = 1;
            StrokeToUse =
StrokeB→GetFixedNumberOfSegmentsStroke(num_segs,false);
            // StrokeToUse = StrokeB→GetPolygonizedStroke(3,true);
        } else StrokeToUse = StrokeB;
        StrokeToUse→SimpleSegments(SegmentListB);
        // StrokeToUse→Segments(6,RAD_70,SegmentListB);
        if (standardize) StrokeToUse→Free();
    }
    // 5th, create the dynamic programming table if we need to
    int numA = (int)SegmentListA→GetSize();
    int numB = (int)SegmentListB→GetSize();
    int neededSize = numA*numB*sizeof(float);
    // DPT = new float[numA*numB];
    if ((DPT = = NULL) || (GetPtrSize((Ptr)DPT) < needed Size)) {
        if (DPT) DisposePtr((Ptr)DPT);
        DPT = (float*)NewPermPtr(neededSize);
    }
    // 6th, ok, let's fill in the table recursively
    // 1st, let's fill in with −1's
    for (int i=0; i<numA; i++)
        for (intj=0; j<numB; j++)
            DPT[i + j*numA] = −1;
    // 2nd, let's start the backwards domino, but only if aspect
ratio is within the bounds
    //     of .5 and 2
    if ((numA = = 0) || (numB = = 0) || (numA/numB > 2) || (numB/numA >
2)) return −1;
        else DPT[numA*numB−1] =
GetMinumumDTWRecursivel(SegmentListA, SegmentListB, numA−1,
NumB−1, numA);
    // 7th, we're done, so let's return the final score, but normalize
    // by the arc length of the two strokes
    float score;
    float normalizer;
    score = DPT[numA*numB−1];
    if (score = = −2) return −1;
    normalizer = (StrokeA→arc_length + StrokeB →arc_length)/2;
    // delete DPT;/
```

```
    return (score/normalizer);
}
```

What is claimed:

1. A method of operating a machine including a signal source for providing data based on gestures, memory for storing data based on gestures, and a processor connected for receiving signals; the method comprising:

receiving target gesture-based data from the signal source; the target gesture-based data including a plurality of target sample data points ordered in time indicating a first path of motion over a first interval of time of a target gesture;

accessing a gesture-based data structure, referred to hereafter as a corpus data structure, stored in the machine memory; the corpus data structure including a plurality of corpus gestures; each respective corpus gesture including a plurality of sample corpus data points ordered in time indicating a respective path of motion over a respective interval of time of the respective corpus gesture;

performing a grouping operation using the corpus sample data points included in the corpus data structure to produce a plurality of corpus gesture sequences of sample data points; each corpus gesture sequence including at least two time-ordered consecutive sample data points included in a respective one of the corpus gestures in the corpus data structure; a first one of the corpus gesture sequences sharing time-ordered consecutive sample data points in common with a second one of the corpus gesture sequences such that when a single corpus gesture included in the corpus data structure indicates a sequence of handwritten symbols, overlapping first and second corpus gesture sequences indicate first and second overlapping subsequences of handwritten symbols;

comparing the target gesture-based data to each of the corpus gesture sequences to determine whether the target gesture-based data matches at least one of the corpus gesture sequences; and producing a matching list of matching corpus gesture sequences that match the target gesture-based data without assigning a semantic label to any respective one of the matching corpus gesture sequences identifying the respective matching corpus gesture sequence; the list including, for each matching corpus gesture sequence, a location in the corpus data structure of the matching corpus gesture sequence.

2. The method of claim 1 wherein the target gesture-based data includes first and second strokes that are consecutive in time; and wherein the method further includes, prior to comparing the target gesture-based data to each of the corpus gesture sequences, concatenating together the last sample data point of the first stroke with the first sample data point of the second stroke into a target gesture sequence of the first plurality of sample data points; each corpus gesture sequence being compared to the target gesture sequence.

3. The method of claim 1 wherein the signal source is a stylus providing data based on gestures of a machine user.

4. The method of claim 3 wherein the machine further includes a display device including a display area for presenting images therein; wherein an image including display features representing at least a portion of the corpus data structure is presented in the display area; and wherein the target gesture-based data received from the machine user is selected by the user from the corpus data structure using the stylus device to interact with the image of the portion of the corpus data structure to select the target gesture-based data.

5. The method of claim 1 further including producing an image using the matching list; the image including display features indicating at least one matching corpus gesture sequence included in the matching list; and presenting the image to a machine user on a display device included in the machine.

6. The method of claim 1 wherein, when the target gesture-based data does not match any one of the corpus gesture sequences, the matching list is empty.

7. The method of claim 1 wherein the signal source is an image scanning device providing image definition data defining an image including a plurality of display features; and wherein the method further includes a converting step for converting the image definition data defining the image including a plurality of display features to the target gesture-based data including the first plurality of sample data points ordered in time.

8. The method of claim 7 wherein the display features included in the image represent gestures.

9. The method of claim 1 wherein the corpus data structure stored in the system memory was converted from image definition data defining an image including a plurality of display features; the image definition data being converted to a plurality of corpus gestures each including a plurality of sample corpus data points ordered in time.

10. The method of claim 9 wherein the display features included in the image represent gestures.

11. A processor-controlled machine comprising:

a signal source for providing target gesture-based data including a plurality of target sample data points ordered in time indicating a first path of motion over a first interval of time of a target gesture;

a processor connected for receiving the target gesture-based data from the signal source; and memory for storing data; the data stored in the memory including instruction data indicating instructions the processor can execute, and a gesture-based data structure, referred to hereafter as a corpus data structure; the corpus data structure including a plurality of corpus gestures; each respective corpus gesture including a plurality of sample corpus data points ordered in time indicating a respective path of motion over a respective interval of time of the respective corpus gesture;

the processor being further connected for accessing the data stored in the memory;

the processor, in executing the instructions in response to receiving the target gesture-based data from the signal source, performing a grouping operation using the corpus sample data points included in the corpus data structure to produce a plurality of corpus gesture sequences of corpus sample data points; each corpus gesture sequence including at least two time-ordered consecutive corpus sample data points included in a respective one of the corpus gestures in the corpus data structure; a first one of the corpus gesture sequences sharing time-ordered consecutive sample data points in common with a second one of the corpus gesture sequences such that when a single corpus gesture included in the corpus data structure indicates a sequence of handwritten symbols, overlapping first and second corpus gesture sequences indicate first and second overlapping subsequences of handwritten symbols;

comparing the target gesture-based data to each of the corpus gesture sequences to determine whether the target gesture-based data matches one of the corpus gesture sequences; and producing a list of matching corpus gesture sequences that match the target gesture-based data without assigning a semantic label to any respective one of the matching corpus gesture sequences identifying the respective matching corpus gesture sequence; the list including, for each corpus gesture sequence, the location in the corpus data structure of the matching corpus gesture sequence.

12. An article of manufacture for use in a processor-controlled machine that includes a user input device for receiving signals indicating actions and requests of a machine user; memory for storing data; a storage medium access device for accessing a medium that stores data; and a processor connected for receiving data from the user input device and for accessing the data stored in the memory; the processor further being connected for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine;

the stored data including target gesture receiving instruction data indicating input instructions the processor can execute to receive target gesture-based data from the user input device; the target gesture-based data including a plurality of target sample data points ordered in time indicating a first path of motion over a first interval of time of a target gesture;

the stored data further including operation performing instruction data indicating response instructions the processor can execute to perform operations for searching for the target gesture-based data in a gesture-based data structure stored in the memory, in response to the target gesture-based data; the gesture-based data structure being hereafter referred to as a corpus data structure; the corpus data structure including a plurality of corpus gestures; each respective corpus gesture including a plurality of sample corpus data points ordered in time indicating a respective path of motion over a respective interval of time of the respective corpus gesture;

when the target gesture-based data is received, execution of the response instructions causing the processor to perform a grouping operation using the corpus sample data points included in the corpus data structure to produce a plurality of corpus gesture sequences of sample data points; each corpus gesture sequence including at least two time-ordered consecutive sample data points included in a respective one of the corpus gestures in the corpus data structure; a first one of the corpus gesture sequences sharing time-ordered consecutive sample data points in common with a second one of the corpus gesture sequences such that when a single corpus gesture included in the corpus data structure indicates a sequence of handwritten symbols, overlapping first and second corpus gesture sequences indicate first and second overlapping subsequences of handwritten symbols;

execution of the response instructions further causing the processor to compare the target gesture-based data to each of the corpus gesture sequences to determine whether the target gesture-based data matches at least one of the corpus gesture sequences;

when a corpus gesture sequence is matched to the target gesture-based data, execution of the response instructions causing the processor to produce a list of matching corpus gesture sequences without assigning a semantic label to any respective one of the matching corpus gesture sequences identifying the respective matching corpus gesture sequence; the list of matching corpus gesture sequences including the location in the corpus data structure of each matching corpus gesture sequence.

13. The method of claim 1 wherein each corpus gesture included in the corpus data structure includes at least one stroke, referred to as a corpus stroke; and wherein, when the grouping operation produces a corpus gesture sequence that includes a sequence of time-ordered consecutive sample data points fewer in number than a sequence of time-ordered consecutive sample data points included in a respective corpus stroke in the corpus data structure, the corpus gesture sequence indicates a portion of a stroke; the target gesture-based data being compared to the portion of the stroke to determine whether the target gesture-based data matches the corpus gesture sequence.

14. The method of claim 1 wherein each corpus gesture included in the corpus data structure includes at least one stroke, referred to as a corpus stroke; and wherein performing the grouping operation to produce a plurality of corpus gesture sequences of sample data points includes grouping sample data points by stroke such that each corpus gesture sequence is referred to as a corpus stroke sequence and includes at least one stroke; first and second overlapping corpus gesture sequences including at least one identical stroke.

15. The method of claim 14 wherein performing the grouping operation to produce a plurality of corpus stroke sequences includes (a) initializing a corpus stroke counter n to 1;

(b) initializing a grouping counter m to 1;

(c) grouping corpus strokes n to n+m−1 into a corpus stroke sequence until grouping counter m reaches a maximum value; and (d) incrementing corpus stroke counter n and repeating steps (b) and (c) for each value of n to a maximum number of strokes in the corpus data structure.

16. The method of claim 1 wherein the plurality of corpus gestures included in the corpus data structure indicates strings of handwritten characters; the overlapping first and second corpus gesture sequences indicating first and second substrings of handwritten characters such that comparing the target gesture-based data to the corpus gesture sequences produces a match of the target gesture-based data to substrings of handwritten characters indicated by the corpus gestures included in the corpus data structure.

17. The method of claim 1 wherein the plurality of corpus gestures included in the corpus data structure indicates groups of handwritten graphical symbols; the overlapping first and second corpus gesture sequences indicating first and second subgroups of handwritten graphical symbols such that comparing the target gesture-based data to the corpus gesture sequences produces a match of the target gesture-based data to subgroups of handwritten graphical symbols indicated by the corpus gestures included in the corpus data structure.

18. The method of claim 1 wherein comparing the target gesture-based data to each of the corpus gesture sequences to determine whether the target gesture-based data matches at least one of the corpus gesture sequences includes using a dynamic programming technique.

19. The method of claim 1 wherein comparing the target gesture-based data to each of the corpus gesture sequences to determine whether the target gesture-based data matches at least one of the corpus gesture sequences includes using a dynamic time warping technique to compare a target stroke function of sample data points of the target gesture-based data to a corpus stroke function of sample data points of each corpus gesture sequence; the target stroke function being mapped to a corpus stroke function of sample data points on a sample data point by sample data point basis by warping a time axis of each of the target and corpus stroke functions.

20. The machine of claim 11 wherein the machine further includes a display device including a display area for presenting images therein; wherein an image including display features representing at least a portion of the corpus data structure is presented in the display area; wherein the signal source is a stylus device for providing data based on gestures of a machine user; and wherein the target gesture-based data received from the machine user is selected by the machine user from the corpus data structure using the stylus device to interact with the image of the portion of the corpus data structure to select the target gesture-based data.

21. The machine of claim 11 wherein the plurality of corpus gestures included in the corpus data structure indicates strings of handwritten characters; the overlapping first and second corpus gesture sequences indicating first and second substrings of handwritten characters; the processor, in executing the instructions to compare the target gesture-based data to the corpus gesture sequences, producing a match of the target gesture-based data to substrings of handwritten characters indicated by the corpus gestures included in the corpus data structure.

22. The article of manufacture of claim 12 wherein the processor-controlled machine further includes a display device including a display area for presenting images therein; wherein an image including display features representing at least a portion of the corpus data structure is presented in the display area; wherein the user input device is a stylus device for providing data based on gestures of the machine user; wherein the target gesture-based data is selected by the machine user from the corpus data structure using the stylus device to interact with the image of the portion of the corpus data structure to select the target gesture-based data; and wherein the input instructions the processor executes to receive the target gesture-based data from the user input device causes the processor to obtain the target gesture-based data from the corpus data structure using position data indicated by the stylus device.

23. The article of manufacture of claim 12 wherein the plurality of corpus gestures included in the corpus data structure indicates strings of handwritten characters; the overlapping first and second corpus gesture sequences indicating first and second substrings of handwritten characters; execution of the response instructions to compare the target gesture-based data to the corpus gesture sequences causing the processor to produce a match of the target gesture-based data to substrings of handwritten characters indicated by the corpus gestures included in the corpus data structure.

\* \* \* \* \*